United States Patent [19]

Nojiri et al.

[11] Patent Number: 4,644,232
[45] Date of Patent: Feb. 17, 1987

[54] METHOD OF AND AN APPARATUS FOR CONTROLLING A PLURALITY OF DC MOTORS

[75] Inventors: Yuukou Nojiri; Kosho Ishizaki; Giichi Ishida; Junshiro Inamura, all of Hitachi, Japan

[73] Assignee: Hitachi, Ltd., Tokyo, Japan

[21] Appl. No.: 662,012

[22] Filed: Oct. 18, 1984

[30] Foreign Application Priority Data

| Oct. 19, 1983 | [JP] | Japan | 58-194166 |
| Oct. 19, 1983 | [JP] | Japan | 58-194167 |
| Jan. 25, 1984 | [JP] | Japan | 59-10145 |
| Feb. 16, 1984 | [JP] | Japan | 59-26057 |

[51] Int. Cl.$^4$ ............................................. H02P 7/68
[52] U.S. Cl. ........................................ 318/66; 318/51; 318/91; 318/101
[58] Field of Search ................. 318/51, 53, 59, 66, 318/67, 91, 101, 102, 103, 105, 62, 34 SE

[56] References Cited

U.S. PATENT DOCUMENTS 4,334,175 6/1982 Tanaka et al. ............... 318/67 X

FOREIGN PATENT DOCUMENTS

| 1079164 | 10/1956 | Fed. Rep. of Germany | 318/66 |
| 53-88908 | 8/1978 | Japan | 318/66 |
| 54-99911 | 8/1979 | Japan | 318/91 |
| 57-203102 | 12/1982 | Japan | 318/51 |
| 57-196804 | 12/1982 | Japan | 318/66 |

OTHER PUBLICATIONS

"A Microprocessor Speed Control System", IEEE Transactions on Industrial Electronics and Control Instrumentation, vol. 24, No. 3, pp. 241–247, Aug. 1977.

Primary Examiner—William M. Shoop, Jr.
Assistant Examiner—Bentsu Ro
Attorney, Agent, or Firm—Antonelli, Terry & Wands

[57] ABSTRACT

The present invention provides method and apparatus to control a plurality of DC motors each having an encoder by a sole microcomputer. The actual rotating speed of each DC motor is detected in response to the signal from the encoder. A pulse width of a voltage which is applied to each motor is controlled due to the deviation between the actual speed and a preset speed. The output signals from the encoders regarding a specific DC motor to the other DC motor are sequentially selected by a selection signal, thereby controlling the speed measurements and calculations regarding a plurality of DC motors and the duties of electric powers which are applied to the DC motors.

7 Claims, 13 Drawing Figures

METHOD OF AND AN APPARATUS FOR CONTROLLING A PLURALITY OF DC MOTORS

BACKGROUND OF THE INVENTION

1. Field of the Invention

The present invention relates to an apparatus for controlling the rotating speed of a plurality of DC motors and, more particularly, to an apparatus of the type in which each DC motor is equipped with an encoder for detecting the rotating speed.

2. Description of the Prior Art

Conventionally, for example, in copying machines, chains and clutches and the like are coupled to an AC motor, and a drum and a fixing roller and the like are driven by a sole motor due to the mechanical interlocking. However, recently, in many cases, each of the optical system driving unit, drum driving unit, fixing roller driving unit, etc. independently uses a motor (particularly, a DC motor equipped with an encoder).

It is a well-known technology that an encoder is provided for a DC motor and a speed command value is compared with an output of the encoder and the DC motor is rotated at a constant speed in response to the speed command.

Such a technology is disclosed in the article: "A MICROPROCESSOR SPEED CONTROL SYSTEM", IEEE TRANSACTIONS ON INDUSTRIAL ELECTRONICS AND CONTROL INSTRUMENTATION, VOL. IECI 24, No. 3, August 1977, pages 241 to 247. The circuit is disclosed in FIG. 1 in page 241.

A fundamental circuit the PLL (phase locked loop) control which is equivalent to the system disclosed in FIG. 1 is shown. As shown in this drawing, in the PLL control, by making the phase of the feedback signal from the encoder coincide with the phase of the reference frequency signal corresponding to the command speed of the motor, the motor can be rotated at a constant instructed speed.

However, in this example, one controller is provided for one motor and nothing is mentioned with regard to the control for a plurality of motors.

In OA (office automation) equipment such as the above-mentioned copying machine, printer or the like, there is a tendency such that the equipment is driven by a plurality of independent motors. However, it is very difficult to control a plurality of motors by a sole controller. This is because there is a difference between the frequency of the reference pulse and the frequency of the feedback pulse, so that it is very difficult to match the phases in control of a plurality of motors having different rotating speeds.

Therefore, when a plurality of motors are controlled, the reference frequency and circuit constant are determined for every motor and a dedicated controller is used for each motor.

Consequently, the controllers of only the number of motors are needed, resulting in a large circuit scale.

SUMMARY OF THE INVENTION

Objects

It is a first object of the present invention to digitally process a signal from an encoder provided for each DC motor and to perform the measurement and control of the speed, thereby controlling a plurality of motors having different set speeds by a common control circuit of a small scale.

A second object of the invention is to shorten the acceleration time upon start-up of each DC motor, thereby allowing the rotating speed of the DC motor to reach a constant speed in a short time.

A third object of the invention is to provide a method of controlling a plurality of DC motors and a control apparatus for embodying such a method, wherein a duty is calculated while the speed is being measured and the timing for starting the calculation of one duty is made coincident with the timing for starting the measurement of the abovementioned one speed, thereby eliminating the difference in timing between the measurement of the speed and the calculation of the duty and enabling the accurate control for the rotating speed to be performed.

The last object of the invention is to provide a practical control apparatus which is fitted for attainment of the above-mentioned objects.

SUMMARY

In this invention, the respective motor speeds are detected on the basis of the feedback signals from the encoders which are provided for the respective DC motors, and a pulse width which is applied to each motor is determined due to the deviation between the actual speed and a preset speed by performing the PWM (pulse width modulation) whole-digital processing, thereby controlling the speed measurements, calculations and duty (pulse width) outputs regarding a plurality of DC motors by a sole micro processing unit.

Namely, the signal from the encoder relative to the DC motor which should be measured is selected in response to the selection signal and the speed of the DC motor is measured. A voltage of the pulse width corresponding to the deviation between the measured speed and a commanded speed is applied to the motor. Next, the selection signal is changed to select the signal from the encoder relative to the other DC motor. In the similar manner as above, the foregoing process is repeated, thereby controlling a plurality of DC motors.

BRIEF DESCRIPTION OF THE DRAWINGS

FIGS. 2 to 4 show a first embodiment to accomplish the first object, in which FIG. 2 is a circuit diagram, FIG. 3 is a flow chart for the operation of the circuit of FIG. 2, and FIG. 4 is a signal time chart;

FIGS. 5 and 6 show a second embodiment to accomplish the first object, in which FIG. 5 is a circuit diagram and FIG. 6 is a flow chart for the operation of the circuit of FIG. 5;

FIGS. 7 to 10 show an embodiment to accomplish the second object, in which FIG. 7 is a circuit diagram, FIG. 8 is a time chart, and FIGS. 9 and 10 are flow charts for the operation of the circuit of FIG. 7; and FIGS. 11 to 13 show still another embodiment to accomplish the third object together with FIGS. 7 and 8, in which FIG. 11 is a time chart and FIGS. 12 and 13 are flow charts for the operation.

DESCRIPTION OF THE PREFERRED EMBODIMENTS

Figure 1:
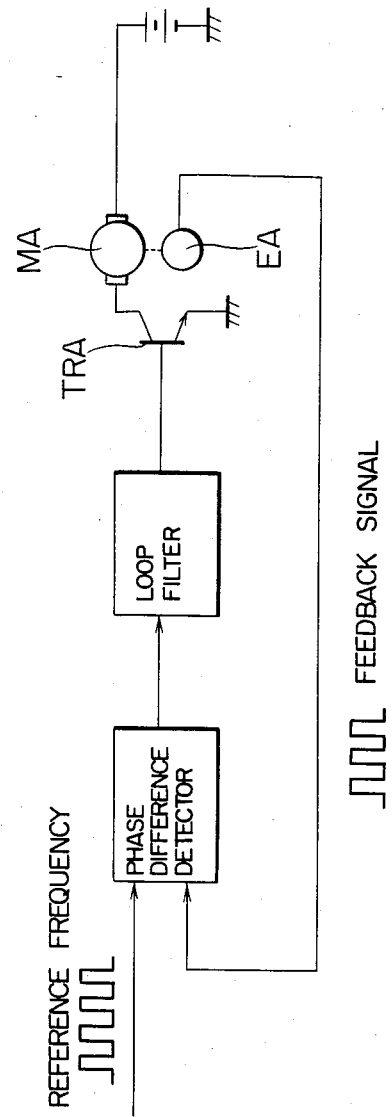
FIG. 1 is a diagram showing a conventional control circuit for a DC motor equipped with an encoder.
Figure 2:
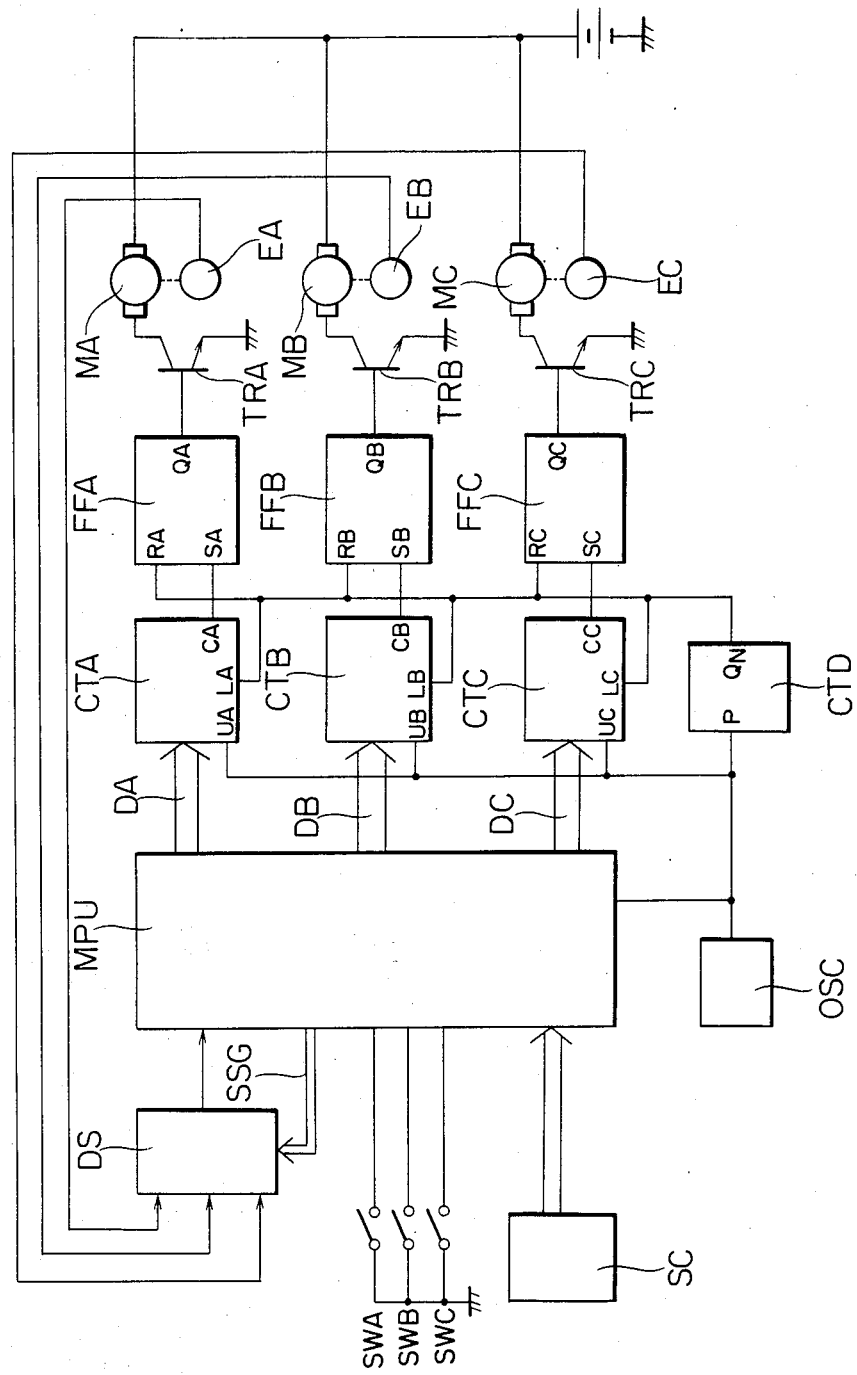
Figure 3:
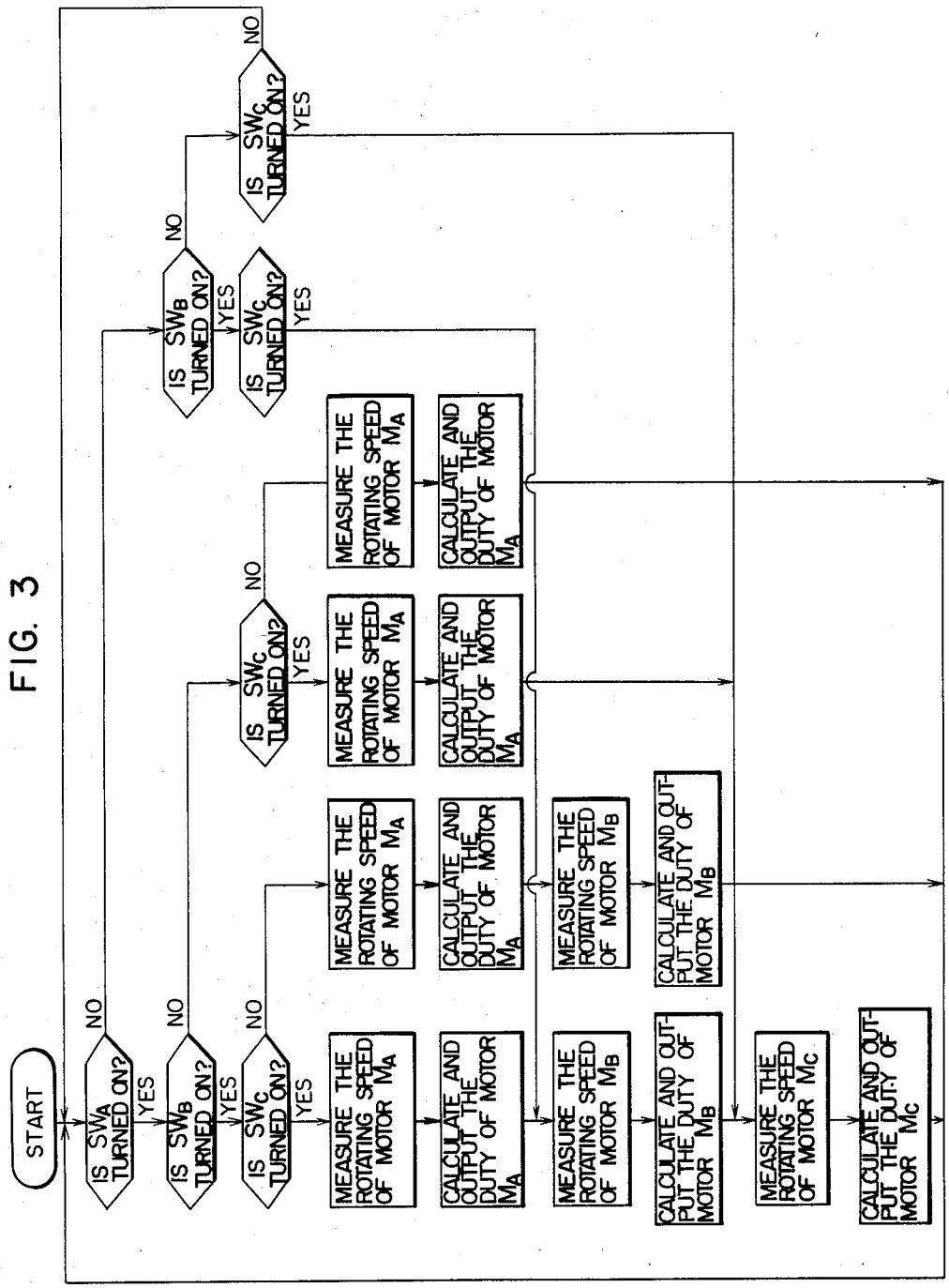
Figure 4:
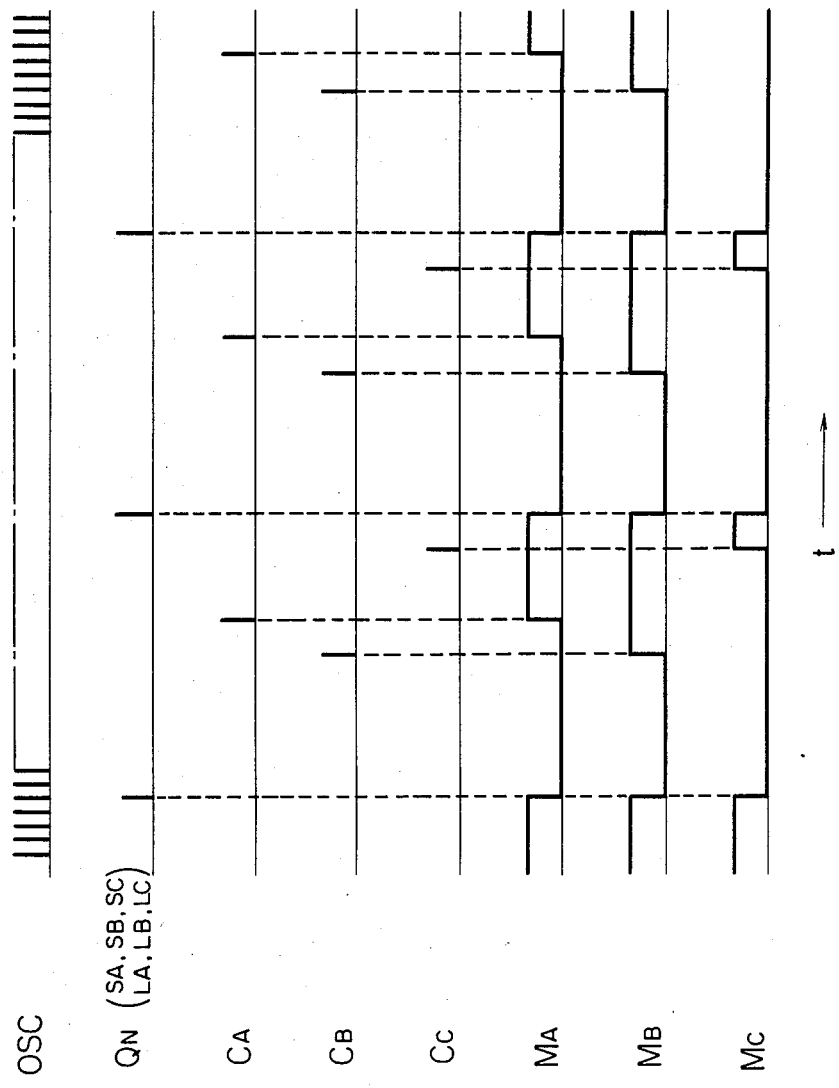

FIGS. 2, 3 and 4 show an embodiment to mainly accomplish the first object and show an example for control of three DC motors.

In FIG. 2, three motors $M_A$, $M_B$ and $M_C$ are equipped with encoders $E_A$, $E_B$ and $E_C$, respectively. Each encoder generates a pulse in association with the rotation of the motor. Each one end of the motors $M_A$, $M_B$ and $M_C$ is connected to a power supply and the current supply to the motors is respectively controlled by transistors $TR_A$, $TR_B$ and $TR_C$. The transistors $TR_A$, $TR_B$ and $TR_C$ are respectively connected to $Q_A$, $Q_B$ and $Q_C$ terminals of flip flops $FF_A$, $FF_B$ and $FF_C$. Set terminals $S_A$, $S_B$ and $S_C$ of the flip flops $FF_A$, $FF_B$ and $FF_C$ are respectively connected to carry output terminals $C_A$, $C_B$ and $C_C$ of counters $CT_A$, $CT_B$ and $CT_C$. On the other hand, reset terminals $R_A$, $R_B$ and $R_C$ of the flip flops $FF_A$, $FF_B$ and $FF_C$ and load terminals $L_A$, $L_B$ and $L_C$ of the counters $CT_A$, $CT_B$ and $CT_C$ are connected to a frequency divided output $Q_N$ of a frequency divider $CT_D$. An input P of the frequency divider and up-count terminals $U_A$, $U_B$ and $U_C$ of the respective counters $CT_A$, $CT_B$ and $CT_C$ are connected to an oscillator OSC, and at the same time they are also connected to a micro processing unit MPU. A clock pulse which is generated from the oscillator OSC becomes a reference clock of the MPU. Data $D_A$, $D_B$ and $D_C$ which are loaded in the respective counters $CT_A$, $CT_B$ and $CT_C$ are outputted from the micro processing unit MPU and become the data having the current supplying widths calculated by the micro processing unit MPU.

On the other hand, output signals of the encoders $E_A$, $E_B$ and $E_C$ are inputted to a data selector DS and either one of these signals is inputted to the micro processing unit MPU in response to a selection signal SSG from the micro processing unit MPU.

In addition, a speed command SC, and operation stop commands $SW_A$, $SW_B$ and $SW_C$ for each motor are inputted to the micro processing unit.

In such an arrangement, it will now be described the case where all of the operation stop commands $SW_A$, $SW_B$ and $SW_C$ are set to ON and operation commands are inputted to the three motors.

When the operation stop commands $SW_A$, $SW_B$ and $SW_C$ are inputted to the micro processing unit MPU, it reads the instructed speeds SC of the motors $M_A$, $M_B$ and $M_C$ and first allows only the output signal of the encoder $E_A$ of the motor $M_A$ to be inputted to the micro processing unit MPU by the selection signal SSG. The micro processing unit measures the speed of the motor $M_A$ by a method whereby the time interval between the encoder pulse and the next encoder pulse is measured by the pulses which are generated from the oscillator OSC or whereby the number of encoder pulses is counted within a constant sampling time in a manner as shown in a flow chart of FIG. 3. The micro processing unit outputs the value which is obtained by calculating the deviation between the set speed SC of the motor and the actual speed of the motor $M_A$ which was measured on the basis of the signal from the encoder $E_A$ as the necessary duty $D_A$. Next, the data of the selection signal SSG is changed to allow only the output signal of the encoder $E_B$ for the motor $M_B$ to be inputted to the micro processing unit MPU. The speed of the motor $M_B$ is measured and the necessary duty $D_B$ is outputted due to the result of arithmetic operation. In the similar manner as above, the necessary duty $D_C$ for the motor $M_C$ is also outputted.

On the other hand, when the power supply is turned on, the oscillator OSC always generates pulses as shown in FIG. 4 and the frequency divider $CT_D$ always outputs the pulse signal $Q_N$ which was frequency-divided into 1/N from the output terminal $Q_N$. When the frequency-divided signal $Q_N$ is outputted, the reset signal is respectively inputted to the reset terminals $R_A$, $R_B$ and $R_C$ of the flip flops $FF_A$, $FF_B$ and $FF_C$. Thus, each level of the outputs $Q_A$, $Q_B$ and $Q_C$ become low, the transistors $TR_A$, $TR_B$ and $TR_C$ are turned off, and the current supply to the motors $M_A$, $M_B$ and $M_C$ is turned off.

The 1/N frequency-divided output $Q_N$ is also inputted to the load terminals $L_A$, $L_B$ and $L_C$ of the counters $CT_A$, $CT_B$ and $CT_C$. The necessary duties $D_A$, $D_B$ and $D_C$ for the respective motors which were calculated by the micro processing unit MPU are always outputted to the counters $CT_A$, $CT_B$ and $CT_C$, so that the values $D_A$, $D_B$ and $D_C$ are preset. Since the pulse signals from the oscillator OSC are inputted to the up-count terminals $U_A$, $U_B$ and $U_C$ of the counters, the counters start counting. When the counters count up, they output the carry signals $C_A$, $C_B$ and $C_C$. These carry signals are inputted to the set input terminals $S_A$, $S_B$ and $S_C$ of the flip flops $FF_A$, $FF_B$ and $FF_C$. Thus, the transistors $TR_A$, $TR_B$ and $TR_C$ are turned on and the current supply to the motors $M_A$, $M_B$ and $M_C$ is started. Those transistors are turned off in response to the next output signal of the frequency-divided output $Q_N$. The speed is controlled by repeatedly performing these operations. Since the set speeds and the actual rotating speeds of the motors $M_A$, $M_B$ and $M_C$ differ, the duties $D_A$, $D_B$ and $D_C$ also differ and the current supplying times to the motors differ as well.

As shown in FIG. 3, in case of driving one or two motors, the measurement of the speed(s) and the calculations of the duty (or duties) may be performed with respect to only the necessary motor(s).

The operations of the counters, flip flops, frequency-divider, and oscillator shown in FIG. 2, can be also carried out in a micro processing unit if it has such a capability and performance.

Figure 5:
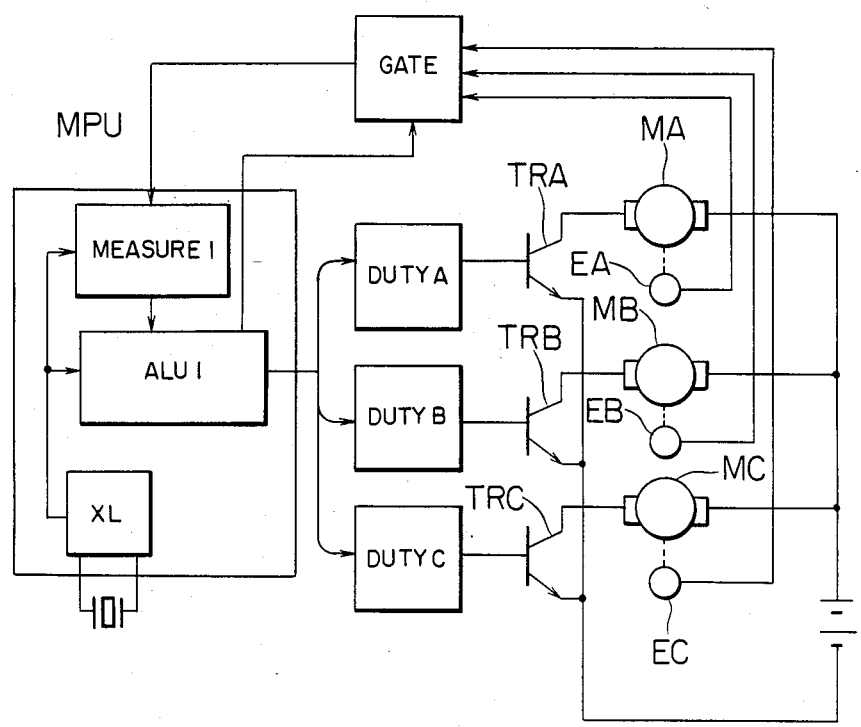
Figure 6:
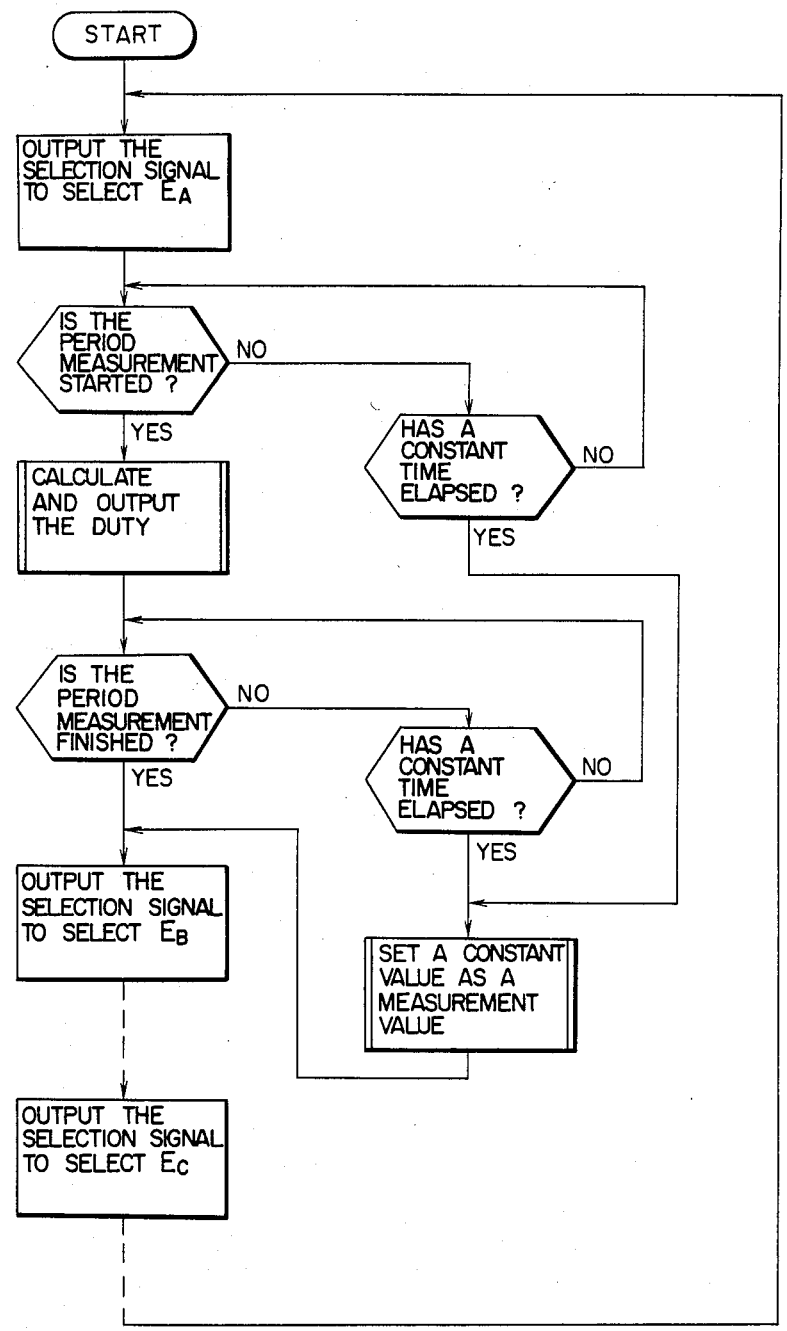

FIGS. 5 and 6 show a practical circuit diagram and a flow chart to accomplish the first object similarly to the embodiment shown in FIGS. 2 to 4. In FIG. 5, $M_A$, $M_B$ and $M_C$ denote the DC motors similar to those shown in FIG. 2, respectively. Likewise, $E_A$, $E_B$ and $E_C$ are the encoders and $TR_A$, $TR_B$ and $TR_C$ are transistors. The output signals of the encoders $E_A$, $E_B$ and $E_C$ are all inputted to an encoder signal period selecting and measuring circuit GATE. This GATE selects either one of the signals from the encoders $E_A$, $E_B$ and $E_C$ in response to a selection signal which is generated from an arithmetic logic circuit $ALU_1$ mentioned later and outputs it. A period measuring circuit $MEASURE_1$ receives this output and measures the period. The $ALU_1$ outputs the above-mentioned selection signal and calculates the duty signal proportional to the time interval when the current should be supplied to the selected motor on the basis of the period measured by the $MEASURE_1$ in the similar manner as in the conventional technology and outputs it. Driving circuits $DUTY_A$, $DUTY_B$ and $DUTY_C$ receive this output and turn on and off the transistors $TR_A$, $TR_B$ and $TR_C$ and control the rotating speeds of the motors $M_A$, $M_B$ and $M_C$ in the similar manner as in FIG. 2. An oscillating unit XL supplies a clock signal to the $ALU_1$ and $MEASURE_1$. The $ALU_1$, $MEASURE_1$ and XL constitute the micro processing unit MPU. This control process is time-sharingly performed with respect to each motor. The flow of this process is shown in a flow chart of FIG. 6. In FIG. 6, the case where the three DC motors $M_A$, $M_B$ and $M_C$ are simultaneously rotated will be explained.

First, the selection signal to select the output signal from the encoder $E_A$ is outputted to the GATE from the ALU$_1$. The GATE receives this selection signal and selects the signal from the encoder E$_A$. The MEASURE$_1$ waits until the first output signal from the encoder E$_A$ is inputted from the GATE. The MEASURE$_1$ starts the measurement of the period in response to this first signal and measures the time interval from the first signal to the next signal from the encoder E$_A$ and finishes the measurement. In the case where the measurement by the MEASURE$_1$ is not started, that is, where the first signal is not outputted from the encoder E$_A$ after the elapse of a constant time after the ALU$_1$ had outputted the selection signal, the ALU$_1$ sets a constant value as a measurement period. The process routine advances to the next step for execution of control to output a selection signal to select the signal from the encoder E$_B$, and the like. When the measurement is started, the ALU$_1$ calculates the duty signal on the basis of the last period measurement value and outputs it to the driving circuit DUTY$_1$. Next, the ALU$_1$ waits for the end of measurement of the period by the MEASURE$_1$. In the case where it is not finished, the ALU$_1$ sets the constant value as the period measurement value; outputs the signal to select the signal from the encoder E$_B$; performs the process similar to that in the case where the output signal from the E$_A$ was selected; then outputs a signal to select the output signal from the encoder E$_C$; carries out the process similar to that in the case where the output signal from the encoder E$_A$ was selected; and again outputs the signal to select the signal from the encoder E$_A$. In this way, by sequentially selecting the signals from the E$_A$, E$_B$ and E$_C$ and calculating the duties, the rotating speeds of the three DC motors M$_A$, M$_B$ and M$_C$ are controlled. As described above, by time-sharingly performing the measurement of the periods and the calculation of the duties, the period detecting circuits and arithmetic logic circuits can be constituted as one circuit. On the other hand, in the case where the measurement could not be done after the elapse of the constant time, the constant value is used as the measurement value and the process routine advances to the next control step, thereby enabling the influence of the result of one motor on the control for the other motor to be minimized. Thus, this makes it possible to control the rotating speed with high accuracy. In this embodiment, the case of simultaneously rotating the three DC motors has been shown; however, a similar effect is also obtained in case of two or less motors or four or more motors.

Figure 7:
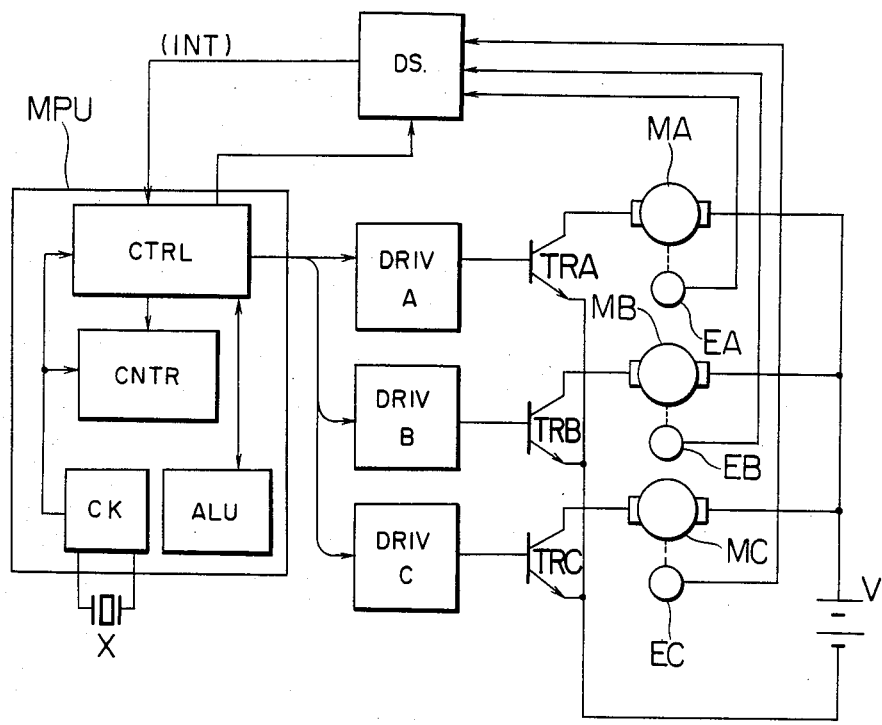

FIGS. 7, 8, 9 and 10 show an embodiment to accomplish the second object of the invention and disclose a practical technology in the case where the motor M$_C$ is newly actuated on the condition whereby the motors M$_A$ and M$_B$ are rotating at steady speeds. FIG. 7 corresponds to FIG. 5 but shows a partially modified form. In the drawings, CTRL denotes a control section and CNTR is a counter. During the time interval until the rotating speed of the motor M$_C$ is stabilized to a steady speed after the motor M$_C$ was actuated, the speed is once measured and the duty is also once calculated with respect to each of the motors M$_A$ and M$_B$. During this time interval, the measurement of the speed and the calculation of the duty regarding the motor M$_C$ are executed twice, respectively. In this way, the motor M$_C$ is controlled more in detail. After the speed became stable to the constant speed, the control for the motor M$_C$ is performed by only the same times as those for the motors M$_A$ and M$_B$ in a conventional manner, thereby shortening the acceleration time upon actuation and stabilizing the motor into the steady condition in a short time. This procedure is shown in a flow chart of FIG. 10. First, the output signal of the encoder E$_C$ is selected in response to the selection signal which is outputted from the control section CTRL in the MPU, thereby measuring the rotating speed of the motor M$_C$. The duty of the motor M$_B$ is calculated during the measurement of the speed of the motor M$_C$ or after the end of measurement. Next, a check is made to see if the speed of the motor M$_C$ becomes the constant speed or not. If it does, the control for the steady state is performed in accordance with the procedure shown in FIG. 9. If not, the selection signal to select the output signal of the encoder E$_A$ is outputted, so that the encoder E$_A$ is selected and the speed of the motor M$_A$ is measured. The duty of the motor M$_C$ is calculated during this measurement of the speed or after the end of speed measurement. Next, the selection signal for the encoder E$_C$ is outputted to select the signal from the encoder E$_C$, thereby allowing the speed of the motor M$_C$ to be measured. The duty of the motor M$_A$ is calculated during or after the end of this speed measurement. Then, a check is made to see if the speed of the motor M$_C$ reaches the constant speed or not. If it does, the control for the steady state is performed in accordance with the procedure shown in FIG. 9. If not, the selection signal for the encoder E$_B$ is outputted to select the signal from the encoder E$_B$ and the speed of the motor M$_B$ is measured. The duty of the motor M$_C$ is calculated during or after the end of this speed measurement. Such procedure is repeatedly executed until the motor M$_C$ becomes the steady state.

Although the case of the three motors has been described in this embodiment, the speed control can be performed in similar procedure even in case of four or more motors or where two or more motors are newly actuated. In addition, it has been explained the case where the ratio of the number of times for speed measurement and duty calculation with regard to the motor M$_C$ to that regarding each of the motors M$_A$ and M$_B$ is 2:1, however, such a ratio may be also set to more than 2:1.

Figure 8:
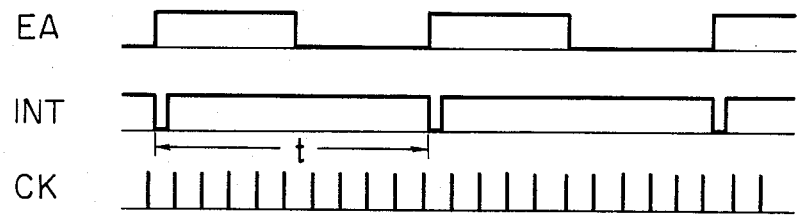
Figure 9:
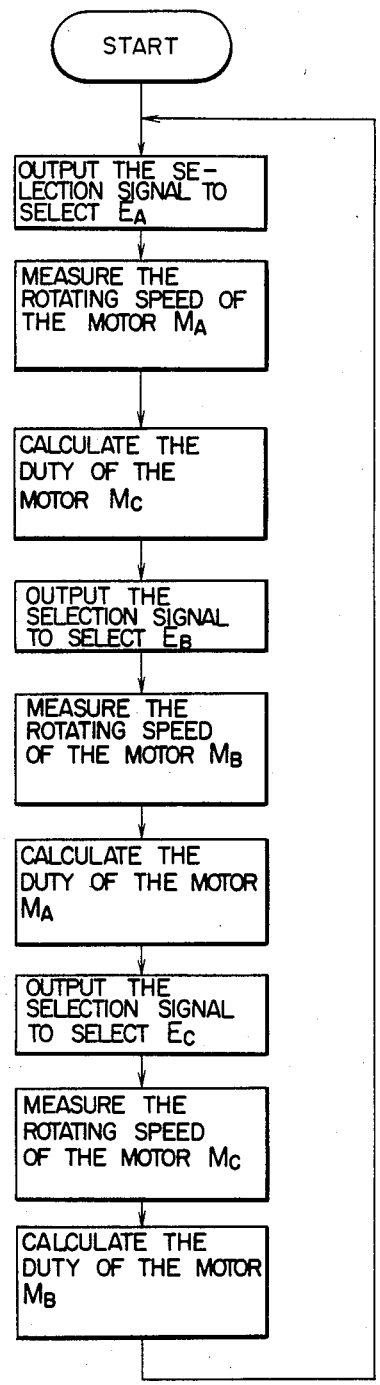
Figure 10:
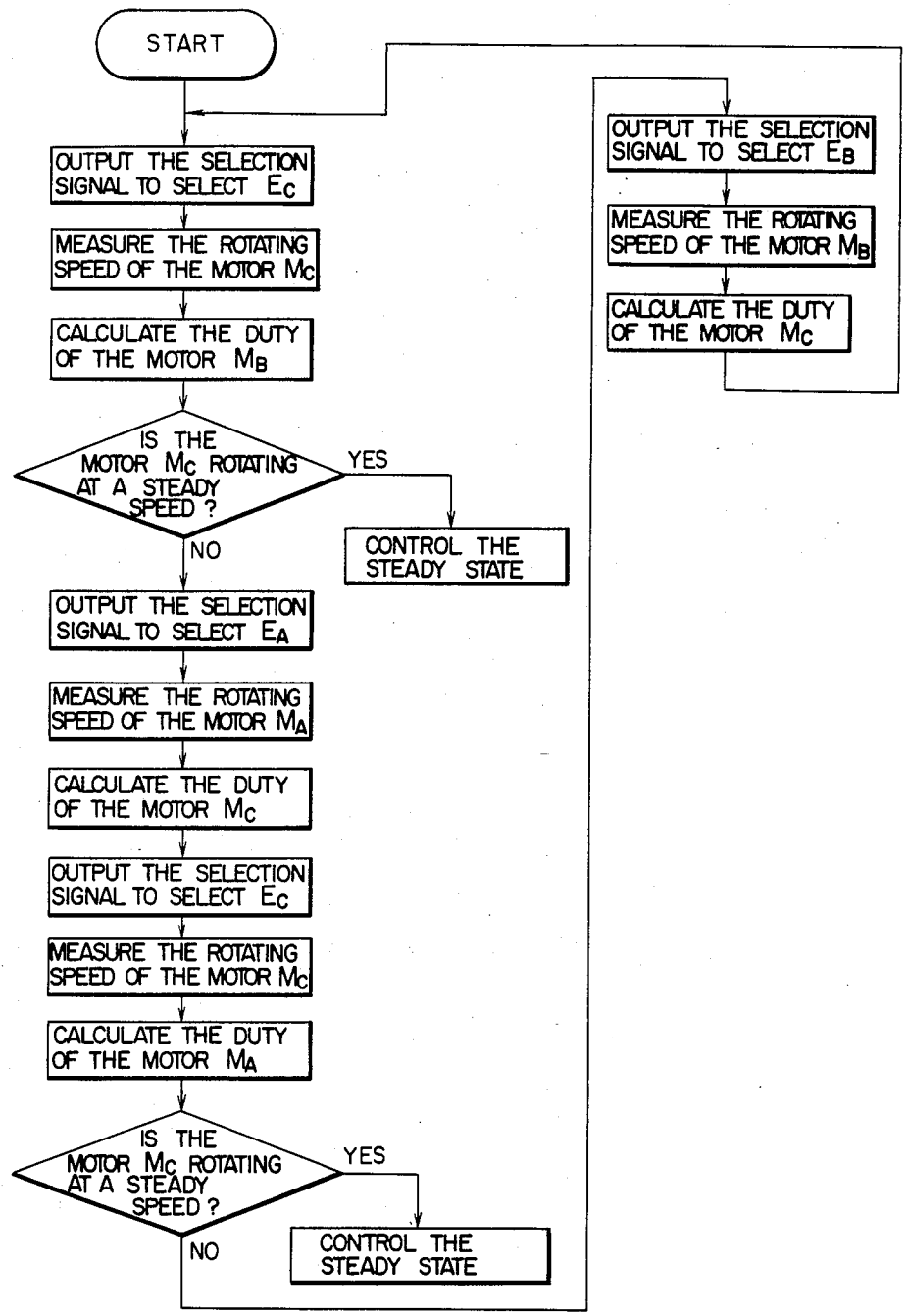
Figure 11:
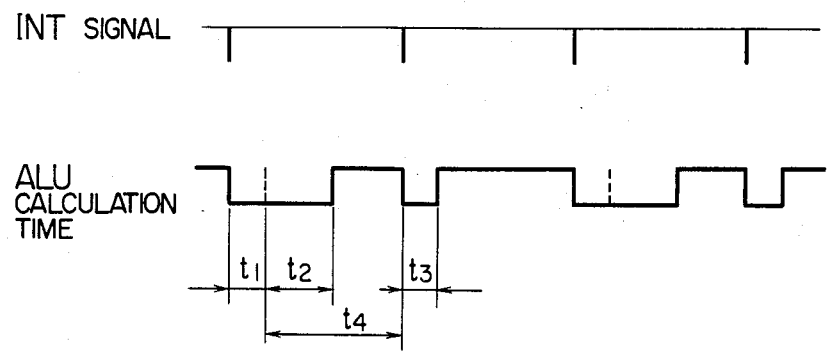
Figure 12:
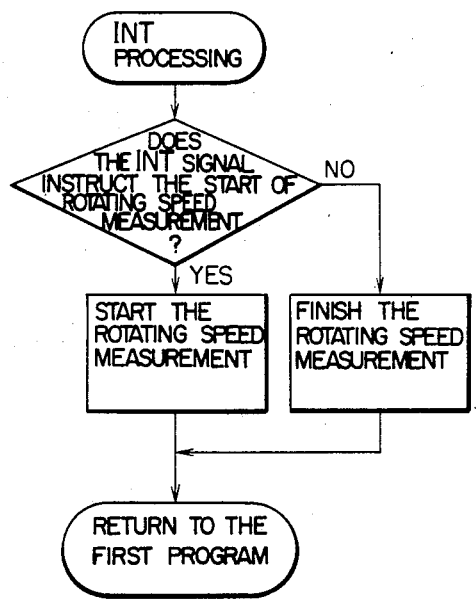
Figure 13:
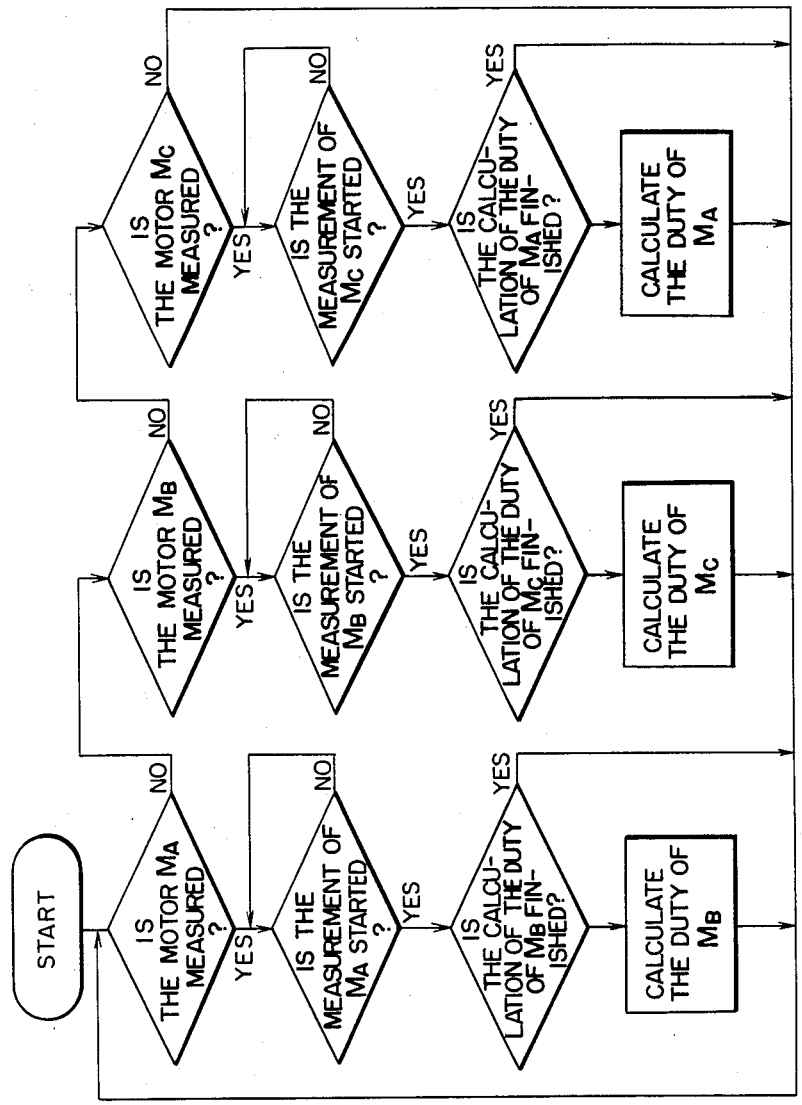

FIGS. 11, 12 and 13 show a technology to accomplish the third object of the invention already mentioned before on the basis of the circuit arrangement of FIG. 7 and in the circuit having the signal waveforms in FIG. 8.

When explaining further in detail, a method of controlling a plurality of DC motors that is constituted by adding FIGS. 11, 12 and 13 to FIGS. 7 and 8 is as follows. Namely, according to this control method, there are provided: a plurality of DC motors; speed detecting apparatuses each of which is connected to the DC motor so as to output a signal responsive to the rotation of each DC motor; a data selector which selects either one of the detection signals from the speed detecting apparatuses and outputs an interruption signal; a plurality of driving apparatuses regarding the plurality of DC motors; and a whole control unit (micro processing unit) connected to the data selector and the driving apparatuses. The duty corresponding to the time for current supply to the DC motor is calculated while the speed of the DC motor is being measured on the basis of the detection signal, thereby controlling the rotating speed.

In addition, an apparatus for controlling a plurality of DC motors according to the present invention comprises: a plurality of DC motors; speed detecting apparatuses each of which is connected to the DC motor so as to output a signal responsive to the rotation of each DC motor; a data selector which selects either one of the detection signals from the speed detecting apparatuses and outputs an interruption signal; a plurality of driving apparatuses regarding the plurality of DC motors; and a micro processing unit which is connected to the data selector and driving apparatuses and consists of a control section which allows the data selector to select either one of the signals from the speed detecting apparatuses and to which the interruption signal based on the detection signal is inputted from the data selector, a counter for measuring the rotating speed of the DC motor on the basis of the interruption signal which was inputted to the control section, and an arithmetic logic section which compares the rotating speed of the DC motor measured with a preset rotating speed and outputs the duty regarding this DC motor to the driving apparatus through the control section.

Moreover, according to the invention, the signal from the speed detecting apparatus is inputted as the interruption signal to the micro processing unit; the rotating speed is measured by measuring the time interval from first interruption to the next interruption; thereby making it possible to calculate the duty during the measurement of the speed.

An embodiment of the method of controlling a plurality of DC motors according to the present invention will now be described with reference to the drawings in conjunction with the embodiment of the apparatus for controlling a plurality of DC motors which is used on the basis of this control method.

In the embodiment, encoders are used as the speed detecting apparatuses.

FIG. 7 is a block diagram showing one embodiment according to the apparatus for controlling a plurality of DC motors which is used to embody the method of controlling a plurality of DC motors according to one embodiment of the invention. FIG. 8 is a diagram for explaining a method of measuring the rotating speeds. FIG. 11 is a diagram for explaining the time relationship between the speed measurement and the duty calculation. FIG. 12 is a flow chart showing the processing for the INT signal of FIG. 11. FIG. 13 is a flow chart showing the sequence for the speed measurement and duty calculation.

First, in FIG. 7, $M_A$, $M_B$ and $M_C$ denote the DC motors, respectively; $E_A$, $E_B$ and $E_C$ are the encoders; $TR_A$, $TR_B$ and $TR_C$ the transistors; DS a data selector; MPU the micro processing unit; CTRL the control section in the MPU; CNTR the counter in the MPU; ALU the arithmetic logic section in the MPU; CK an oscillating section in the MPU; X a crystal; and DRIVA, DRIVB and DRIVC show driving apparatuses, respectively.

Each of the encoders $E_A$ to $E_C$ is connected to the DC motor so as to output a signal responsive to the rotation of each of the DC motors $M_A$ to $M_C$. The data selector DS selects either one of the signals from the encoders $E_A$ to $E_C$ and outputs an interruption signal. The driving apparatuses DRIVA to DRIVC relate to the DC motors $M_A$–$M_C$. The micro processing unit MPU is connected to the data selector DS and driving apparatuses DRIVA–DRIVC. The unit MPU is constituted by the control section CTRL, counter CNTR, arithmetic logic section ALU, oscillating section CK, etc.

The control section CTRL allows the data selector DS to select either one of the signals from the encoders. The interruption signal based on the signal from the data selector DS is inputted to the CTRL. The counter CNTR measures the rotating speed of the DC motor on the basis of the interruption signal inputted to the control section CTRL. The arithmetic logic section ALU compares the measured rotating speed of the DC motor with the preset rotating speed and outputs the duty regarding this DC motor to the driving apparatus through the control section CTRL.

The control method according to the present invention will then be explained with respect to the above-mentioned arrangement.

In this embodiment, the case of simultaneously controlling the rotating speeds of the three DC motors $M_A$, $M_B$ and $M_C$ will be described.

That is, the encoders $E_A$, $E_B$ and $E_C$ are correspondingly attached to the respective DC motors $M_A$, $M_B$ and $M_C$. For example, as shown in FIG. 8, the detection signal of the frequency proportional to the rotating speed of the DC motor $M_A$ is outputted from the encoder $E_A$ in association with the rotation of the DC motor $M_A$. The similar detection signal is also outputted from each of the other encoders $E_B$ and $E_C$.

The data selector DS selects either one of the output signals from the encoders $E_A$–$E_C$ in response to the signal from the control section CTRL in the micro processing unit MPU and outputs the pulse signal synchronized with the leading edge of the signal from the encoder $E_A$, for instance, as indicated by the interruption signal INT in FIG. 8 to the control section CTRL as the interruption signal INT.

The micro processing unit MPU compares the preset value of the rotating speed of each motor with the actual rotating speed measured on the basis of the interruption signal INT which is inputted through the data selector DS. Then, the MPU outputs the duty data for the current supply to each motor to the driving apparatuses DRIVA, DRIVB and DRIVC for the DC motors $M_A$, $M_B$ and $M_C$ so that the actual rotating speed always coincides with the preset rotating speed.

The driving apparatuses DRIVA–DRIVC turn on the transistors $TR_A$, $TR_B$ and $TR_C$ for constant time intervals in accordance with the data from the micro processing unit MPU.

As described above, the rotating speeds of the DC motors $M_A$–$M_C$ are controlled due to the ON-state times of the transistors $TR_A$–$TR_C$, namely, due to the duty values.

For example, in the case where the rotating speed of the DC motor $M_A$ is lower than the preset rotating speed, the micro processing unit MPU outputs the data value so as to turn on the transistor $TR_A$ for a longer time interval to the driving apparatus DRIVA, thereby increasing the rotating speed of the DC motor $M_A$. In FIG. 7, V represents a power supply for driving the motors.

The method of detecting the rotating speeds of the DC motors will be explained with reference to FIG. 8.

It is now assumed that the data selector DS selects the signal from the encoder $E_A$. The data selector DS outputs the interruption signal INT relative to the pulse signal synchronized with the leading edge of the signal from the encoder $E_A$ to the control section CTRL in the micro processing unit MPU.

A time interval t from the first interruption signal INT to the second interruption signal INT in the control section CTRL is measured by the counter CNTR due to the number of pulses which are generated from the oscillating section CK (for example, the CK is constituted by the crystal X or the like).

Although this time interval t is inversely proportional to the rotating speed of the motor, the rotating speed of the motor can be measured by measuring the time interval.

After completion of the measurement of the rotating speed of the DC motor $M_A$, the control section CTRL then outputs the signal to select the encoder $E_B$ to the data selector DS, thereby sequentially measuring the rotating speeds of the DC motors $M_B$ and $M_C$ in the similar manner as mentioned above.

The measured rotating speed and the preset rotating speed are compared by the arithmetic logic section ALU, so that the duty relative to the ON-state time data value regarding each motor is outputted.

The speed measurement and duty calculation are performed in this way. However, since the signal from the encoder is inputted as the interruption signal INT, the arithmetic logic section ALU is in the inoperative state during the time interval from the reception of the first interruption signal INT to the reception of the second interruption signal INT.

The duty is thus calculated using this inoperative time.

Practically speaking, as shown in FIG. 11, the duty of a time $t_2$ is calculated using a time interval $t_4$ from the time when the arithmetic logic section ALU receives the first interruption signal INT and carries out the interruption processing as shown in FIG. 12 (checks the interruption signal INT to see if it instructs the start of measurement or not and performs the processing to start the speed measurement in the case where the signal INT instructs the start of measurement) during a time $t_1$ to the time when the ALU receives the second interruption signal INT and likewise starts the interruption processing as shown in FIG. 12 (at this time, checks the interruption signal INT to see if it instructs the end of measurement or not and performs the processing to finish the speed measurement in the case where the INT signal instructs the end of measurement). Thereafter, the ALU returns to the first program, i.e., the program prior to receipt of the first interruption signal INT.

This makes it possible to reduce the inoperative time of the arithmetic logic section ALU and to shorten the time interval for the speed measurement, so that the control can be performed more accurately.

Returning to FIG. 11, $t_1$ denotes the time necessary to process the interruption signal INT at the start of speed measurement; $t_2$ is the duty calculation time; $t_3$ is the processing time for the interruption signal INT at the end of speed measurement; and $t_4$ is the time mentioned above.

Since the time necessary for duty calculation is shorter than the time required for speed measurement, after the end of duty calculation for one DC motor, if the duty calculation for the next DC motor is immediately started and if such operation is repeatedly executed, this will cause the situation such that the duty calculation is performed before the speed measurement of a certain DC motor. Namely, the duty calculation is performed twice on the basis of the same speed measurement value and the duty calculation is done using the preceding speed measurement value, resulting in unstable control.

Therefore, a new duty calculation is started after the start of speed measurement, thereby preventing that the duty is calculated twice by the same measurement value.

This procedure is shown in a flow chart of FIG. 13.

That is, a check is made to determine that the speed measurement is performed with respect to which DC motor among the DC motors $M_A$, $M_B$ and $M_C$ (simply abbreviated as A, B and C). For example, in case of measuring the speed of the DC motor A, a check is made to see if the speed measurement for the DC motor A is started or not (namely, to see if the interruption signal INT to instruct the start of measurement is received and the processing for measurement finishes or not as shown in FIG. 12). In the case where the measurement is started, a check is then made to see if the duty calculation for the DC motor B finishes or not. The duty calculation is performed only when the duty calculation is not finished. When the duty calculation finishes, the apparatus waits for the start of speed measurement for the next DC motor.

In the case where the three DC motors A, B and C rotate, as shown in FIG. 13, the measurements for the DC motors A, B and C are sequentially performed and the duty calculations for the DC motors B, C and A are sequentially carried out in correspondence thereto. The timings to start the duty calculations are as described above.

Due to this, more stable and accurate control can be performed.

In the cases where the time interval for speed measurement regarding each DC motor is constant and where the difference between the time necessary for measurement and the time required for duty calculation can be decided, the above-mentioned procedure may be not executed by constituting such that the next calculation is not performed during the time when the above-mentioned difference is decided.

In the apparatus according to the foregoing embodiment, the encoders are used as the speed detecting apparatuses. However, any other devices may be widely used as the speed detecting apparatuses for use in the embodiment.

We claim:

1. An apparatus for controlling rotating speeds of a plurality of DC motors comprising:
    DC motors;
    encoders each of which is coupled to each rotary shaft of said DC motors and outputs a pulse signal corresponding to a rotating speed of each of the DC motors in association with the rotation of said motor;
    a detecting circuit for detecting the rotating speed of each of the motors by using a period of said pulse signal outputted from said encoder;
    an arithmetic logic circuit which receives the rotating speed detected by said detecting circuit, compares said rotating speed at which said DC motor should rotate, determines whether said DC motor should be accelerated or decelerated or rotated at the same rotating speed as it is, calculates a current supplying time to said DC motor on the basis of said determination, and outputs a duty signal proportional to said current supplying time; and
    driving circuits each of which receives the duty signal from said arithmetic logic circuit and controls the current supply to said DC motor;

wherein a predetermined constant rotating speed is used as the detecting rotating speed when the pulse signal is not outputted from said encoder even after the elapse of a constant time interval.

2. An apparatus for controlling a plurality of DC motors comprising:
a plurality of DC motors;
encoders each of which is connected to each rotary shaft of said DC motors and outputs a signal of a frequency corresponding to a rotating speed of each of the DC motors;
a data selector for selecting one of the signals from said plurality of encoders;
a plurality of driving apparatuses for respectively driving said plurality of DC motors; and
a whole control unit including one counter for sequentially detecting the rotating speeds of said plurality of DC motors in response to the frequency signals which are outputted from said plurality of encoders and a control section for controlling said driving apparatuses corresponding to said respective motors in response to said detected rotating speeds of the respective motors,
wherein a speed measurement and duty calculation for a DC motor newly actuated among said plurality of DC motors being performed two or more times as compared with the number of times of the speed measurement and duty calculation for the other DC motor which has already been rotating at a steady speed until the rotating speed of said newly actuated DC motor reaches a steady speed.

3. An apparatus according to claim 2, wherein said encoders only supply the signal of a frequency corresponding to a rotating speed to said whole control unit via said data selector.

4. A method of controlling rotational speed of a plurality of DC motors in a speed controlling apparatus having a whole control unit comprising: a plurality of DC motors; speed detecting apparatuses each of which is connected to each of said DC motors so as to output a pulse signal representative to the rotation of each of said motors; a data selector which selects one of said pulse signals from said speed detecting apparatuses and outputs an interruption signal, wherein the pulse signal of each of said speed detecting apparatuses is only supplied to the whole control unit via said data selector; a plurality of driving apparatuses, the method including calculating in the whole control unit a duty corresponding to a current supplying time to said DC motor while measuring the speed of said DC motor on the basis of the period of said pulse signal from said speed detecting apparatus, and controlling the rotating speed of said DC motor in accordance therewith.

5. A method according to claim 4, wherein in order to avoid the timing relation between the speed measurement and the duty calculation from being shifted, during the time interval when the speed of one DC motor is being measured, the duty regarding said one DC motor is calculated and the next duty calculation is performed after the start of next speed measurement.

6. An apparatus for controlling a plurality of DC motors comprising:
a plurality of DC motors;
speed detecting apparatuses each of which is connected to each of said DC motors and outputs a signal responsive to the rotation of each of said DC motors;
a data selector which selects one of detection signals from said speed detecting apparatuses and outputs an interruption signal;
a plurality of driving apparatuses relative to said plurality of DC motors; and
a whole control unit consisting of a control section which is connected to said data selector and driving apparatuses and allows said data selector to select one of the detection signals from said speed detecting apparatuses and to which the interruption signal based on said detection signal is inputted from said data selector, a counter for measuring the rotating speed of the DC motor in response to the interruption signal inputted to said control section, and an arithmetic logic section which compares the measured rotating speed of the DC motor with a preset rotating speed and outputs the duty relative to said DC motor to the driving apparatus through said control section.

7. An apparatus according to claim 6, wherein said speed detecting apparatuses only supply the detection signal thereof to said data selector.

* * * * *